United States Patent Office 3,324,998
Patented June 13, 1967

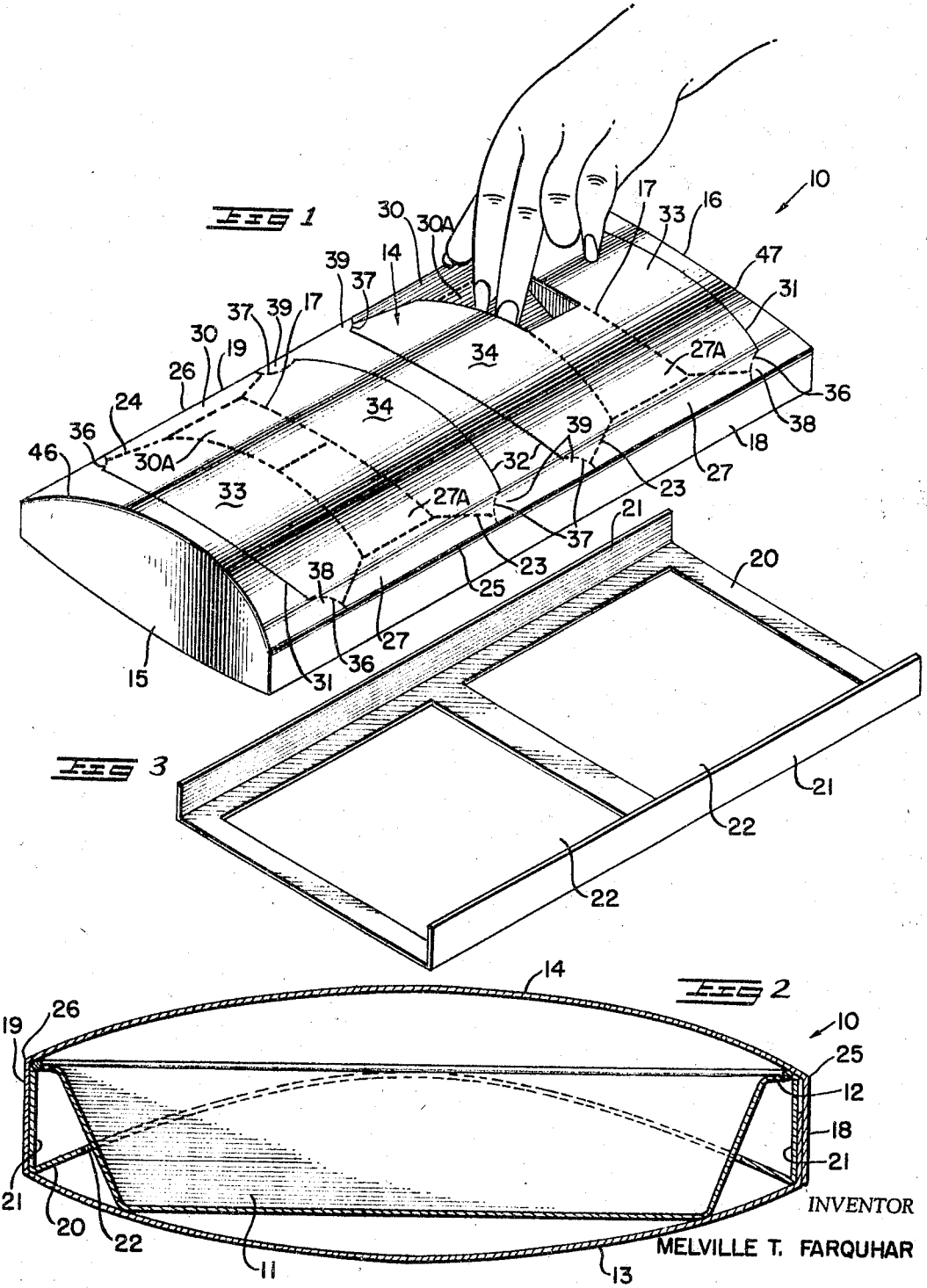

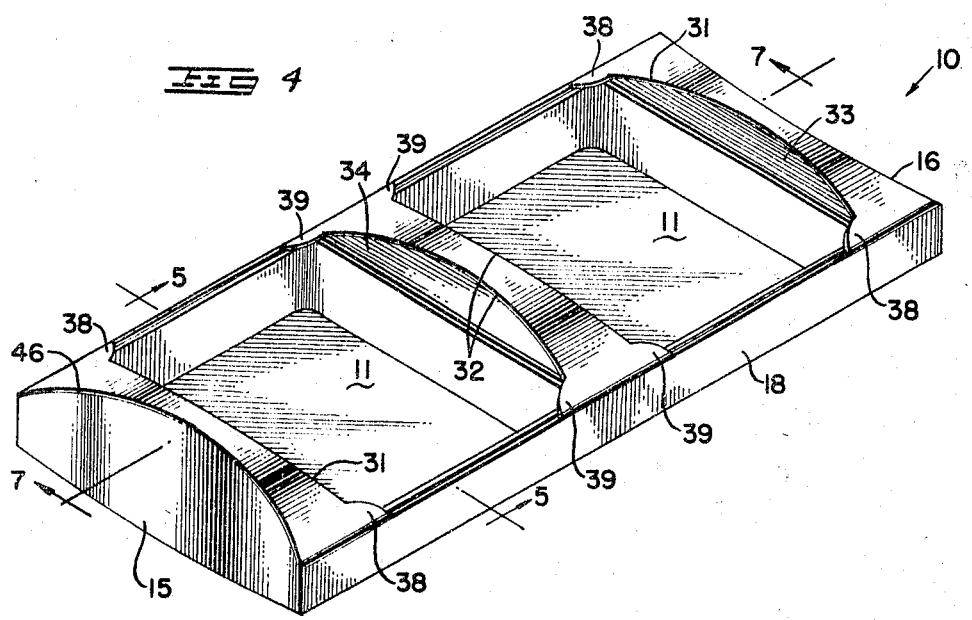
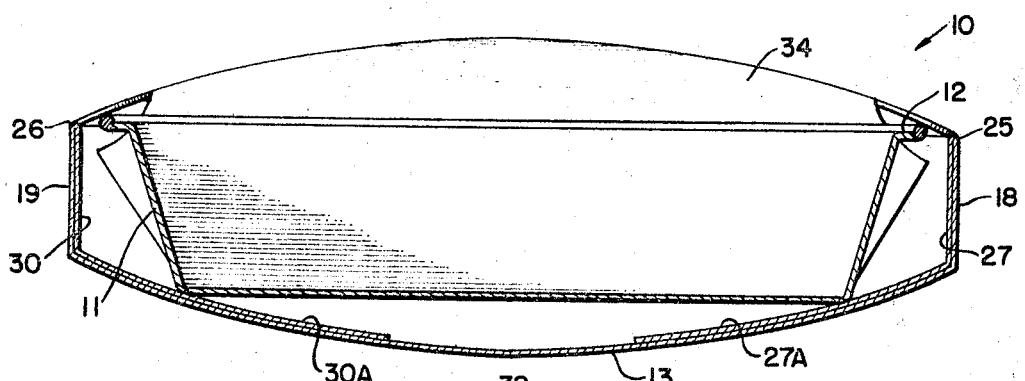
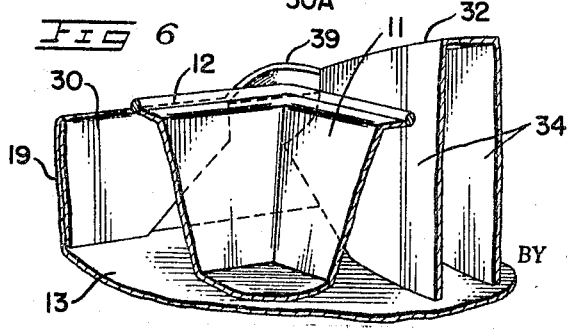

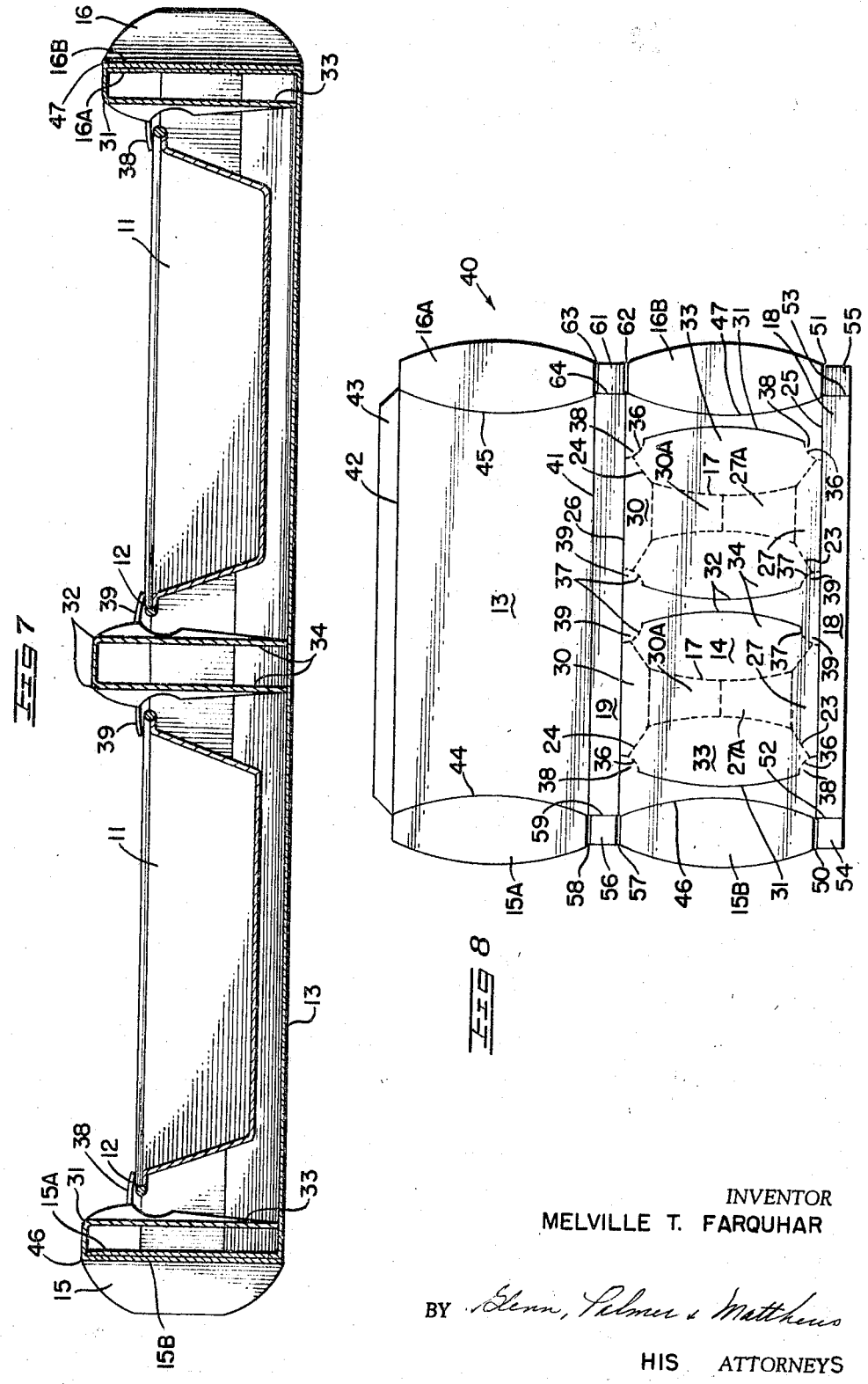

3,324,998
CONTAINER AND BLANKS FOR MAKING SAME
Melville T. Farquhar, Bon Air, Va., assignor to Reynolds Metals Company, Richmond, Va., a corporation of Delaware
Filed Oct. 23, 1965, Ser. No. 503,178
15 Claims. (Cl. 206—46)

This invention pertains to an improved receptacle and more particularly to an improved receptacle for holding and supporting article means therewithin and thereon against relative movement between said article means and said receptacle and to improved blanks for making such a receptacle or the like.

The food industry, particularly many companies in the food catering business serving airlines and the like, have the problem of providing a container or receptacle of minimal cost for use in storing and transporting food products such as serving dish means or the like containing a complete dinner to be served in flight. Usually each dish is removed from its receptacle, heated or cooked, and then served on a separate tray. The original receptacle is usually discarded and is a total loss once the food has been removed. In addition to the extra cost to provide a separate serving tray, there is the added cost of maintaining each of the separate serving trays hygenically clean commensurate with their use as food serving trays. Of course it would be desirable to eliminate these added costs, if possible. Present serving trays are also deficient in their ability to fasten a food serving dish in position and have no provisions for catching any spilled food product. Serving trays are commonly held on an airline passenger's lap during flight and any spilled food or beverage would cause damage.

Accordingly, it is a feature of this invention to provide an improved receptacle of simple and economical construction, which is easily assembled, and which may be used as a receptacle for storing and transporting dish-like container means as well as providing serving tray means therefor.

Another feature of this invention is to provide such a receptacle having holding means preventing undesirable relative movement between the receptacle and dish-like container means carried therewithin.

Another feature of this invention is to provide a receptacle having fastening means for yieldingly fastening on said receptacle dish-like container means previously carried therewithin.

Another feature of this invention is to provide an improved receptacle which when used as a serving tray for supporting dish-like container means thereon has means for catching any spilled food products as well as having provisions for containing such spilled food product without damage to a user holding such serving tray.

Another feature of this invention is to provide a receptacle having arcuate outer wall means which provide greater rigidity and strength for such receptacle, and due to such arcuate configuration provides thermal insulation between the receptacle and dish-like container.

Another feature of this invention is to provide a receptacle having convex bottom and top wall means, a pair of concave end walls, and inner vertical walls with their bottom and top edges respectively engaging the entire arcuate inner surface of the bottom and top walls thereby providing the maximum in hoop strength when using such receptacle as a serving tray.

Therefore, it is an object of this invention to provide an improved receptacle having one or more of the novel features of this invention as set forth above or hereinafter shown or described.

Another object of this invention is to provide improved receptacle blanks for such a receptacle or the like.

Other objects, uses, and advantages of this invention are apparent from a reading of this description, which proceeds with reference to the accompanying drawings forming a part thereof and wherein:

FIGURE 1 is a perspective view of an improved receptacle of this invention showing tear means in the top wall thereof and showing the manner of tearing along such tear means to provide opening means in the top wall of such receptacle for receiving dish-like container means normally carried therewithin.

FIGURE 2 is a sectional view showing dish-like container means carried within the receptacle of FIGURE 1 and particularly showing the position of holding means for holding such dish-like container against movement relative to the receptacle.

FIGURE 3 is a perspective view of the holding means or spacer used in the receptacle of FIGURE 1 to hold a pair of dish-like containers therewithin.

FIGURE 4 is a perspective view of the receptacle of FIGURE 1 used as a serving tray and showing a pair of dish-like containers supported within such receptacle and held therein by fastening means or tabs at the corners of each dish-like container.

FIGURE 5 is a sectional view on the line 5—5 of FIGURE 4.

FIGURE 6 is an enlarged perspective view of a corner fragment of the receptacle as shown in FIGURE 4 particularly showing a fastening tab engaging the upper corner of a receptacle.

FIGURE 7 is a sectional view on the line 7—7 of FIGURE 4 particularly showing the upward projection of the convex top wall with the dish-like containers in position and showing the air space at the bottom of the receptacle providing thermal insulation and serving as a catch basin for any spilled beverage or the like.

FIGURE 8 is a plan view of the blank used in forming the receptacle of FIGURE 1.

While the various features of this invention are hereinafter illustrated and described as being particularly adaptable for providing receptacles used as containers and serving trays for food products, for example complete dinners as served by the airlines, it is to be understood that the various features of this invention can be utilized singly or in any combination thereof to provide receptacles for other products as desired.

Therefore, this invention is not to be limited to only the embodiments illustrated in the drawings because the drawings are merely utilized to illustrate one of the wide variety of uses of this invention.

In the exemplary embodiment of this invention illustrated in FIGURES 1–8 an improved receptacle 10 is illustrated, as well as an improved blank, shown in FIGURE 8, for making such receptacle. While the features of this invention may be incorporated in a receptacle carrying one or more dish-like containers, in this example receptacle 10 is shown adapted to carry two of such containers.

Receptacle 10 of this invention, illustrated in perspective in FIGURE 1, is of simple and economical construction and has features for carrying two dish-like food containers or serving dishes 11 therewithin with provisions to hold such dishes against movement with respect to the receptacle 10. In addition receptacle 10 has arcuate, preferably convex, bottom and top walls which are held spaced apart in their arcuate relationship by inner walls having their bottom and top edges correspond respectively in contour to the bottom and top wall of the receptacle to thereby provide increased strength and stability to receptacle 10. Tear means in the convex top wall of such receptacle defines contoured foldable flaps which are folded into the receptacle and enable the dishes previously carried therewithin to be supported in recessed openings thus provided. Means is provided for fastening such dishes in the recessed openings to minimize any tendency for food to spill out of the dishes. The arcuate configuration of the top wall assures that with the dishes held in the recessed openings, the inner walls provided by the inwardly folded flaps and by portions of the top wall serve as baffles to deflect any food or beverage spilled from within the dishes. Furthermore, the arcuate configuration of the bottom wall in combination with the top wall and inner walls assures that such spilled food is contained within the receptacle as well as providing thermal insulation between the bottom wall and the dishes.

Receptacle 10 is adapted for carrying dish-like container means shown as a pair of dishes each designated by the numeral 11 and illustrated particularly in FIGURES 2 and 4. Each dish 11 in this exemplary illustration has a peripheral projection or lip 12 extending from the terminal end portion of its side walls and lying in a common plane and each dish 11 has a generally flat bottom wall. It will be appreciated that dishes without peripheral projecting lips may also be carried efficiently within and on receptacle 10.

Receptacle 10 has a convex bottom wall 13 and convex top wall 14. The bottom and top walls 13 and 14 are held in spaced apart relation by side wall means cooperating therewith to define an elongated closed receptacle.

The side wall means includes a pair of spaced apart end walls 15 and 16 arranged in generally parallel relation at opposite ends of receptacle 10 and a pair of side walls 18 and 19. Bottom and top walls 13 and 14 cooperate with end walls 15 and 16 and side walls 18 and 19 to define the closed receptacle as previously mentioned.

The side walls 18 and 19 are generally rectangular in shape and arranged in spaced apart parallel relation defining opposite sides of receptacle 10. Side walls 18 and 19 are fastened to the side edges of bottom and top walls 13 and 14.

End walls 15 and 16 have bottom and top edges which correspond in contour to the arcuate bottom 13 and top 14 wall respectively.

Each end wall 15 and 16 has an arcuate outer surface which extends in a smooth simple arc between side walls 18 and 19 defining a concave end wall in each instance. Each end wall 15 and 16 is preferably of double thickness throughout its total area. End wall 15 is formed by an inner flap portion 15A attached to bottom wall 13 and an outer flap portion 15B attached to top wall 14. Similarly, end wall 16 is formed by an inner flap portion 16A attached to bottom wall 13 and an outer flap portion 16B attached to top wall 14. The inner and outer portions 15A and B and 16A and B are suitably fastened to form their respective end walls as will be subsequently described. It will be appreciated that the concave double thickness end walls 15 and 16 at each end of receptacle 10 cooperating with the convex bottom and top walls 13 and 14 provide the maximum in hoop strength for receptacle 10.

The access means in receptacle 10 for inserting and removing dishes 11 is provided through end walls 15 and 16 and such end walls are easily opened and reclosed without damage thereto. Each end wall 15 or 16 may be reclosed by using a suitable glue which enables the inner and outer flap portions of each end wall to be fastened and unfastened without damage thereto while providing an adequate closure. The end walls may also be fastened in position using known mechanical tab and slit means (not shown) by providing for example a projecting tab in the terminal end portion of flap 15B cooperating with a slit adjacent the inner end of flap 15A.

Holding means is provided for holding each dish 11 within receptacle 10 against movement relative to receptacle 10 during use of such receptacle for storing and transporting. The holding means comprises a spacer illustrated in FIGURE 3 of the drawings and designated by the numeral 20. Spacer 20 is generally U-shaped having a pair of vertical sides each designated by the numeral 21 and a pair of cutouts each designated by the numeral 22. Each cutout 22 conforms in general outline to the lower end portion of its associated container 11.

Spacer 20 is shown in FIGURE 2 of the drawings in position receptacle 10 and dishes 11.

It should be noted also from FIGURE 2 that the width of spacer 20 is larger than the width of the receptacle 10 such that upon insertion of such spacer and containers 11 within the receptacle 10 the spacer 20 is bowed in an arcuate path and engages the peripheral projection 12 of its associated dish 11. This bowing effect assures that a portion of spacer 20 engages lip 12 while providing an arcuate line of contact at opposite ends of each dish 11 to provide stability for each dish 11 throughout its height. It should also be noted that U-shaped spacer 20 is oriented with its open end up and that its side walls 21 each has a height approximately equal to side walls 19 and 20 of receptacle 10 thereby assuring that upon insertion of spacer 20 and dishes 11 within receptacle 10 there is a minimum of relative movement therebetween.

Top wall 14 is convex in shape and has tear means therein defining a pair of openings. Each opening is defined by an H-shaped perforation 17 therein which is generally centrally located from side to side and a pair of roughly U-shaped perforations 23 and 24 symmetrically arranged at the terminal open ends of the H-shaped perforation 17. Tear means is also provided in top wall 14 adjacent each terminal end of U-shaped perforations 23 and 24 as will be described later in this description.

Score means is provided in top wall 14 for cooperation with perforations 17, 23, and 24 to define contour flap means foldable about their associated score means. A pair of score means or lines 25 and 26 define the adjoining edges of side walls 18 and 19 respectively with top wall 14.

Score line 25 cooperates with the half of the H-shaped perforation 17 adjacent thereto and with U-shaped perforation 23 to define flap 27 which is foldable about fold line 25. Similarly, at the opposite side of the receptacle 10, fold line 26 cooperates with the other end portion of H-shaped perforation 17 adjacent thereto and with U-shaped perforation 24 to define flap 30 foldable about its associated fold line 26. Flaps 27 and 30 each have a terminal end portion 27A and 30A respectively which may be torn off along the central portion of their associated U-shaped perforations 23 and 24 respectively. Flaps 27A and 30A may be folded coextensive with bottom wall 13.

A pair of score or fold lines 31 and 32 are provided in top wall 14 and arranged generally transverse the direction of score lines 25 and 26. Each fold line 31 and 32 has an arcuate configuration.

Fold line 31 cooperates with one vertical leg of U-shaped perforation 23, with a side of H-shaped perforation 17, and with a corresponding leg of U-shaped 24 to define a contoured foldable flap 33 which is folded along fold line 31 normal to the bottom wall 13. In a similar manner score line 32 cooperates with the opposite side of H-shaped perforation 17, with the other leg of U-shaped perforation 23, and the other leg of U-shaped perforation 24 to define a contoured foldable flap 34 which folds along fold line 32 normal to bottom wall 13.

The contoured flap means or flaps 33 and 34 have their top and bottom edges defined respectively by score line 31 and one side of the generally H-shaped perforation 17 for flap 33 and by score line 32 and the opposite side of the H-shaped perforation for flap 34. Fold lines 31 and 32 correspond to the convex contour of top wall 14 while the opposite sides of H-shaped perforation 17 correspond to the contour of bottom wall 13. Flaps 33 and 34 thus provide inner wall means, upon being folded about their associated score lines 31 and 32, arranged between end walls 15 and 16 and having cooperating contour means at their opposite vertical edges thereby maintaining the convex configuration of bottom and top walls 13 and 14 between the end wall locations to provide increased strength for receptacle 10 when it is used as a serving tray. Each opening means in top wall 14 for receiving each dish 11 is provided upon folding flaps 27, 30, 33, and 34 inwardly about their associated fold lines.

As previously mentioned, bottom wall 13 is arcuate, convex in this example, in shape. The support means for dish 11 is provided by bottom wall 13 in that each dish rests on the inner surface of such bottom wall 13. FIGURE 5 illustrates a dish 11 resting in its supported position on receptacle 10 with opposite lower edges of each dish resting on the terminal end portions 27A and 30A of flaps 27 and 30 respectively. The folding of the flaps along the inner surface of wall 13 provides a stronger bearing surface for each dish 11. It will be appreciated, however, that portions 27A and 30A could be torn away and the bottom of each dish supported directly on the inner surface of bottom wall 13 while folding the remaining portions of flaps 27 and 30 upwardly to provide additional protection against spillage.

Note that the arcuate shape at the bottom of the receptacle assures an air space between each dish 11 and the inner surface of bottom wall 13. This space provides thermal insulation between receptacle 10 and the bottom of each dish 11 and also provides a space for retaining any spilled food. Note that a space is also provided between dish 11 and the sides of receptacle 10.

Arcuate perforations are provided adjacent the corners of each opening provided in top wall 14. One pair of arcuate perforations each designated by the numeral 36 associates with fold line 31. While another pair of similar arcuate perforations each designated by the numeral 37 associates with fold line 32.

Each perforation 36 and 37 extends in a small circular arc between a terminal end of its associated fold line and engages the fold line 25 at one side of receptacle 10 or fold line 26 at the opposite side as the case may be.

Each cut 36 defines a corresponding tab 38 and each cut 37 defines a corresponding tab 39. As will be apparent from FIGURES 6 and 7 of the drawings, the pairs of tabs 38 and 39 are symmetrically arranged in the corners of each opening defined upon folding flaps 27, 30, 33, and 34. Each tab 38 and 39 provides fastening means for each container 11 carried within receptacle 10.

The height of each dish 11 supported on receptacle 10 is such that each tab 38 and 39 yieldably engages the upper surface of such dish. Because of their yieldable nature tabs 38 and 39 may be lifted without damage thereto and a dish-like container inserted and supported on bottom wall 13 in receptacle 10 as previously mentioned and yieldably fastened in position by such tabs. While each tab in this illustration engages lip 12 provided in each dish 11, it will be appreciated that it is not necessary that a lip be provided in each dish. Each tab could engage effectively the top of a simple vertical wall and fasten a dish in position.

As will be apparent from FIGURES 4 and 7 of the drawings, each dish 11 is fastened in a recessed position within the opening provided in top wall 14. The convex contour of top wall 14 assures that with each dish 11 inserted in its associated opening a portion of the top wall 14 projects above each dish 11. This upward projection in cooperation with each inner wall defined by flaps 33 and 34 in particular assures that with receptacle 10 used as a serving tray in flight, for example, any food spillage from each dish 11 would be caught in receptacle 10.

Identification means is preferably provided on the outer surface of the top wall 14 adjacent the H-shaped perforation 17. This makes certain that upon tearing along such perforation and folding the adjoining flaps inwardly or tearing portions of them away any identification, instructions, or advertising provided to identify the contents of the receptacle, manner of using, or source of products will be hidden from view and thereby provide a receptacle having maximum of eye appeal.

Receptacle 10 can be formed in any suitable manner and made from any suitable foldable material. It is preferably formed from the blank 40, illustrated in FIGURE 8. The blank 40 is made of cardboard or the like having a side such as the exposed surface thereof laminated with metallic foil, such as aluminum-containing metallic foil or the like, suitably colored, embossed, imprinted, or remaining plain as desired.

Blank 40 is suitably cut and scored and includes a series of parallel rectilinear score or fold lines 25, 26, 41, and 42 defining side wall 18 extending beyond score line 25, top wall 14 between score lines 25 and 26, side wall 19 between score lines 26 and 41 and bottom wall 13 between score lines 41 and 42. An extension flap 43 extends beyond score line 42 and provides a closure flap for receptacle 10. Flap 43 is suitably fastened as by glue or the like to side wall 18 to define an open ended tubular structure.

As will be apparent from FIGURE 8 of the drawing, bottom wall 13 and top wall 14 are of identical peripheral configuration. A pair of generally identical score lines 44 and 45 are arranged at opposite ends of bottom wall 13. Each score line 44 and 45 is arranged in an arcuate path facing away from the other. Blank 40 extends beyond score line 44 at one end of bottom wall 13 and score line 45 at the opposite end thereof defining respectively the inside wall surfaces 15A and 16A of end walls 15 and 16. Each wall 15 and 16 has a double thickness as will be subsequently described.

In a similar manner a pair of generally identical score lines 46 and 47 are provided in blank 40 at opposite ends of top wall 14. Score lines 46 and 47 define the outer wall surfaces 15B and 16B respectively of end walls 15 and 16.

In this exemplary embodiment of the invention the end walls 15 and 16 including both the inner and outer wall portions thereof are generally elliptical in outline truncated at each end across the minor diameters thereof such that upon assembling blank 40 to form receptacle 10 the truncated ends associate with side walls 18 and 19.

Blank 40 has a pair of cuts 50 and 51 therein arranged in line with the opposite terminal ends of score line 25, and a pair of score lines 52 and 53 arranged normal to the terminal inner end of cuts 50 and 51 respectively and extending therefrom to the outer periphery of blank 40. Cut 50 and score line 52 define a closure tab 54 at one end of side wall 18 while cut 51 and score line 53 define a closure tab 55 at the opposite end of side wall 18.

Closure tabs are also provided at the terminal ends of side wall 19. Closure tab 56 is defined at one end of side wall 19 by a pair of cuts 57 and 58 of equal length coextensive with one terminal end of score lines 26 and 41 respectively and a score line 59 arranged transverse to and normal to the inner ends of cuts 57 and 58.

Similarly, at the opposite end of side wall 19 a closure tab 61 is provided. Tab 61 is defined by a pair of cuts 62 and 63 of equal length coextensive with the other terminal end of score lines 26 and 41 respectively and a score line 64 arranged transverse to and normal to the terminal inner ends of cuts 62 and 63. Tabs 54, 55, 56, and 61 are folded about their respective score lines and provide tabs against which each end wall is folded for increased rigidity for receptacle 10 formed from blank 40.

Tear means is provided in convex top wall 14 defining a pair of openings therein as previously described. Each opening in top wall 14 is defined by an H-shaped perforation 17 which is generally centrally located between side walls 18 and 19 and a pair of roughly U-shaped perforations 23 and 24 symmetrically arranged in the terminal open ends of H-shaped perforation 17. The sides of H-shaped perforation 17 are slightly arcuate in shape, corresponding to bottom wall 13. Perforations 17, 23, and 24 outline the terminal ends of four flaps 27, 30, 33, and 34 providing each opening upon being folded about their associated fold lines. The cooperation of the perforations to define each foldable flap was described previously.

Each opening in top wall 14 has two pairs of fold lines 31 and 32 and portions of fold lines 25 and 26 associated therewith. Fold lines 31 and 32 are arcuate in shape and are arranged generally parallel to the end walls 15 and 16, while fold lines 25 and 26 also define the juncture of top wall 14 with side walls 18 and 19 respectively. Flaps 27, 30, 33, and 34 are folded respectively about fold lines 25, 26, 31, and 32.

Arcuate perforations are provided in top wall 14 defining fastening means or a fastening tab in each corner of the openings provided in top wall 14. The arcuate configuration defining each corner also minimizes any tearing tendencies.

A perforation 36 extends from each terminal end of score line 31 into engagement with either score line 25 or 26 on its associated side to define a tab 38 at each end of score line 31. Similarly, a perforation 37 extends from each terminal end of score line 32 into engagement with either score line 25 or 26 on its associated side to define a tab 39 at each end of score line 32. As previously mentioned tabs 38 associated with each of the openings in top wall 14 engage the upper corners of its associated dish 11, upon forming receptacle 10 from blank 40, to thereby fasten such dish in position.

Note that terms such as "side wall," "end wall," etc., have been used in this disclosure merely for convenience and ease of description.

Thus it is seen that an improved receptacle of simple and economical construction is provided by this invention which is easily assembled, and which may be used as a receptacle for storing, transporting, and providing serving tray means for dish-like container means.

Such receptacle has features for holding and fastening a dish-like container carried thereby to prevent relative movement between such receptacle and such dish-like container.

Further, this invention provides improved blanks for forming such receptacles or the like.

While the form of the invention now preferred has been disclosed as required by statute, other forms may be used, all coming within the scope of the claimed subject matter which follows.

What is claimed is:

1. A receptacle for dish-like container means which has peripheral projection means comprising, access means in said receptacle for inserting and removing said dish-like container means, means for closing said access means to provide rigidity for said receptacle upon removal of said dish-like container means from therewithin, tear means in said receptacle defining opening means for receiving said removed dish-like container means therethrough while maintaining the top of said dish-like container means exposed, support means in said receptacle for supporting said dish-like container means, and fastening means for fastening said dish-like container means in its supported position.

2. A receptacle as set forth in claim 1 in which said fastening means comprises tab means engaging said peripheral projection means of said dish-like container means thereby yieldingly fastening said dish-like container means in position on said receptacle.

3. A receptacle for carrying dish-like container means therewithin and for supporting said dish-like container means thereon comprising, access means in said receptacle for inserting and removing said dish-like container means, holding means for holding said dish-like container means against movement thereof while within said receptacle, support means for supporting said dish-like container means on said receptacle after removal from within said receptacle, and fastening means for fastening said dish-like container means on said receptacle in its supported position after removal from within said receptacle.

4. A receptacle for dish-like container means having peripheral projection means said receptacle being adapted for storing said dish-like container means and providing serving tray means therefor comprising, arcuate bottom and top wall means in said receptacle, side wall means cooperating with said arcuate bottom and top wall means to define a closed receptacle, recloseable access means in said side wall means for placing said dish-like container means in and out of said receptacle, tear means in said arcuate top wall means defining opening means in said top wall means for receiving said dish-like container means therethrough, and support means for supporting said dish-like container means on said receptacle after removal from within said receptacle, whereby upon tearing said top wall along said tear means to define an opening and subsequently supporting said dish-like container means on said support means said arcuate bottom and top wall means provide increased structural strength for said receptacle while assuring that any spillage that might occur from said dish-like container means is contained within said receptacle.

5. A receptacle for carrying a plurality of dish-like containers therewithin and for supporting said dish-like containers thereon comprising, holding means for holding said dish-like containers against movement relative to said receptacle while within said receptacle, access means in said receptacle for inserting and removing said dish-like containers, support means for supporting said dish-like containers on said receptacle after removal from within said receptacle, and fastening means for fastening said dish-like containers on said receptacle in their supported positions after removal from within said receptacle, said fastening means comprising a plurality of yieldable tabs engaging said dish-like containers and yieldingly holding them on said receptacle.

6. A receptacle for dish-like container means in which said receptacle is adapted for storing and transporting said dish-like container means and providing serving tray means therefor comprising, arcuate bottom and top wall means in said receptacle, side wall means cooperating with said arcuate bottom and top wall means to define a closed receptacle, reclosable access means in said side wall means for inserting and removing said dish-like container means, holding means for holding said dish-like container means against movement thereof relative to said receptacle while being transported within said receptacle, tear means in said arcuate top wall means providing opening means in said top wall means of said receptacle for receiving said dish-like container means therethrough, and support means for supporting said dish-like container means on said receptacle with the upper surface of said dish-like container recessed below said top wall means, whereby upon tearing said top wall means along said tear means and inserting said dish-like container means through said opening means onto said support means said top wall means extends above said dish-like container means assuring that spillage from said dish-like container means is contained within said receptacle.

7. A receptacle as set forth in claim 6 further comprising fastening means including tab means engaging and yieldingly fastening said dish-like container means in its supported position on said receptacle.

8. A receptacle as set forth in claim 7 in which said side wall means includes a pair of end walls arranged one at each opposite end of said receptacle and having their bottom and top edges corresponding in contour to said arcuate bottom and top wall means respectively, said reclosable access means being provided by said end wall means, and a pair of side walls arranged one at each opposite side of said receptacle and fastened to said end walls and to said bottom and top wall means to define said closed receptacle.

9. A receptacle as set forth in claim 8, further comprising score means in said top wall means and in which said tear means defines contoured flap means foldable about said score means generally normal to said bottom wall means to provide inner wall means between said end walls having cooperating contour means for maintaining said arcuate bottom and top walls apart between said end walls while maintaining their arcuate shape to provide increased strength for said receptacle.

10. A receptacle as set forth in claim 8 in which said end walls extend normal to said bottom and top walls and extend in arcuate contour between said side walls.

11. A receptacle as set forth in claim 8 in which each of said arcuate bottom and top wall means is convex in shape and said support means is provided by the concave inner surface of said outwardly convex bottom wall, whereby said dish-like container means is supported on said inner surface with a thermally insulating air space along its middle portion between it and said bottom wall thus providing thermal protection.

12. A receptacle for a plurality of dish-like containers made from a single sheet of foldable material in which said receptacle is adapted for storing and transporting said dish-like containers therewithin and providing serving tray means therefor comprising, convex bottom and top wall means in said receptacle, a pair of end walls arranged one at each opposite end of said receptacle, said end walls having their bottom and top edges corresponding in arcuate contour to said bottom and top wall means respectively and providing recloseable access means in said receptacle for inserting and removing said dish-like containers, a pair of side walls arranged one at each opposite side of said receptacle and fastened to said end walls and to said convex bottom and top wall means to define a closed receptacle, holding means for holding said dish-like containers against movement thereof relative to said receptacle while within said receptacle, score means in said convex top wall means, tear means in said convex top wall means providing a plurality of opening means in said top wall means corresponding to the number of dish-like containers carried within said receptacle for receiving each of said dish-like containers through an associated opening means, said tear means defining contoured flap means foldable about said score means associated therewith and generally normal to said bottom and top wall means to provide inner wall means between said end walls having bottom and top edges corresponding in arcuate contour to said bottom and top wall means respectively for maintaining said convex bottom and top walls spaced apart between said end walls while maintaining their convex shapes and providing increased hoop strength for said receptacle, support means for supporting each of said dish-like containers on said receptacle with the upper surface of each dish-like container recessed below said top wall means, and fastening means including tab means engaging and yieldingly fastening each of said dish-like containers on its associated support means, whereby upon tearing said convex top wall means along said tear means and inserting said dish-like containers through its associated opening means onto said support means said convex top wall means extends above each of said dish-like containers assuring that spillage from said dish-like containers is contained within said receptacle.

13. A receptacle as set forth in claim 12 further comprising metal foil provided in association with a side of said single sheet providing better insulating characteristics and further assuring that any spillage from said dish-like containers is contained within said receptacle.

14. A blank for forming a receptacle for dish-like container means, said blank being cut and scored to define, generally convex bottom and top wall means, side wall means cooperating with said convex bottom and top wall means to define a closed receptacle upon assembling said blank, access means in said receptacle for inserting and removing said dish-like container means, support means for supporting said dish-like container means on said receptacle in a recessed position after removal from within said receptacle, and fastening means comprising integral yielding tab means engaging and fastening said dish-like container means on said receptacle in said recessed position.

15. A blank for forming a receptacle for dish-like container means in which said receptacle is adapted for storing and transporting said dish-like container means therewithin and providing serving tray means therefor, said blank being cut and scored to define, convex bottom and top wall means, a pair of end walls arranged one at each opposite end of said receptacle upon forming said receptacle from said blank, said end walls having their bottom and top edges corresponding in arcuate contour to said bottom and top wall means respectively and providing reclosable access means in said receptacle for inserting and removing said dish-like container means, a pair of side walls arranged one at each opposite side of said receptacle and fastened to said end walls and to said convex bottom and top wall means to define a closed receptacle, score means in said convex top wall means, tear means in said convex top wall means providing opening means in said top wall means for receiving said dish-like container means therethrough, said tear means defining contoured flap means foldable about said score means generally normal to said bottom and top wall means to provide inner wall means between said end walls, said inner wall means having bottom and top edges corresponding in arcuate contour to said bottom and top wall means respectively for maintaining said convex bottom and top walls spaced apart between said end walls while maintaining their convex shapes and providing increased hoop strength for said receptacle, support means for supporting said dish-like container means on said receptacle with the upper surface of said dish-like container means recessed below said top wall means, and tab means engaging and yieldingly fastening said dish-like container means in said recessed position, whereby upon forming said receptacle from said blank and tearing said convex top wall means along said tear means and inserting said dish-like container means through said opening means to be supported on said support means said convex top wall means extends above said dish-like container means assuring that spillage from said dish-like container means is contained within said receptacle while providing a space at the lower portion of said dish-like container means which provides a dual function of thermal insulation as well as holding any food spilled from within said dish-like container means.

References Cited

UNITED STATES PATENTS

| | | | |
|---|---|---|---|
| 1,176,932 | 3/1916 | Smith | 229—6 |
| 2,205,332 | 6/1940 | Aste | 206—46 |
| 2,924,372 | 2/1960 | Kirkeby | 229—34 |

FOREIGN PATENTS 524,291  8/1940  Great Britain.

JOSEPH R. LECLAIR, *Primary Examiner.*

R. PESHOCK, *Assistant Examiner.*